(12) United States Patent
Decarreau et al.

(10) Patent No.: US 10,419,270 B2
(45) Date of Patent: Sep. 17, 2019

(54) PHYSICAL UPLINK CONTROL CHANNEL CELLS IN A COMMUNICATION NETWORK USING CARRIER AGGREGATION

(71) Applicant: Nokia Solutions and Networks Oy, Espoo (FI)

(72) Inventors: Guillaume Decarreau, Munich (DE); Benoist Pierre Sebire, Tokyo (JP); Chunli Wu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/546,757

(22) PCT Filed: Jan. 29, 2015

(86) PCT No.: PCT/CN2015/000066
§ 371 (c)(1),
(2) Date: Jul. 27, 2017

(87) PCT Pub. No.: WO2016/119081
PCT Pub. Date: Aug. 4, 2016

(65) Prior Publication Data
US 2018/0019911 A1    Jan. 18, 2018

(51) Int. Cl.
*H04L 12/24*      (2006.01)
*H04L 5/00*       (2006.01)
(Continued)

(52) U.S. Cl.
CPC .......... *H04L 41/0654* (2013.01); *H04L 5/001* (2013.01); *H04L 5/0053* (2013.01);
(Continued)

(58) Field of Classification Search
CPC . H04L 41/0654; H04L 47/827; H04L 5/0035; H04L 67/1059; H04L 29/08387;
(Continued)

(56) References Cited

U.S. PATENT DOCUMENTS

2013/0260735 A1\* 10/2013 Dinan ............... H04W 72/0406
                                                         455/418
2014/0119304 A1\* 5/2014 Li ....................... H04W 52/146
                                                         370/329
(Continued)

FOREIGN PATENT DOCUMENTS

CN          103503535 A      1/2014
WO     WO 2014/021638 A1     2/2014
(Continued)

OTHER PUBLICATIONS

NTT Docomo et al R2-143073 (Update of R2-141967), Support of PUCCH on SCell for CA—RAN2 aspects; Aug. 17, 2014.
(Continued)

*Primary Examiner* — Warner Wong
(74) *Attorney, Agent, or Firm* — Harrington & Smith

(57) ABSTRACT

A communication is executed between a user equipment and a communication network based on carrier aggregation using a first group of at least two PUCCH groups, the first group including a primary serving cell that carries a first PUCCH, and first serving cells which use the first PUCCH, and a second group of the at least two PUCCH groups, the second group including a secondary serving cell that carries a second PUCCH, and second serving cells which use the second PUCCH. In case a predetermined condition occurs, the communication is continued by exchanging the first group by the second group wherein the secondary serving cell that carries the second PUCCH becomes the primary serving cell and vice versa.

11 Claims, 2 Drawing Sheets

(51) Int. Cl.
  *H04W 16/32* (2009.01)
  *H04W 72/04* (2009.01)
  *H04W 76/15* (2018.01)
  *H04W 76/34* (2018.01)
  *H04W 36/00* (2009.01)
  *H04L 12/28* (2006.01)

(52) U.S. Cl.
  CPC ........... *H04L 5/0098* (2013.01); *H04W 16/32* (2013.01); *H04W 72/0413* (2013.01); *H04L 12/2863* (2013.01); *H04W 36/00* (2013.01); *H04W 76/15* (2018.02); *H04W 76/34* (2018.02)

(58) Field of Classification Search
  CPC .. H04L 12/2863; H04W 16/32; H04W 16/24; H04W 72/0413; H04W 72/00; H04W 72/1268; H04W 72/1263; H04W 72/1278; H04W 72/1284; H04W 4/20; H04W 28/20; H04W 3/08; H04W 36/16; H04W 36/34; H04W 48/00; H04W 48/17; H04W 48/18; H04W 48/20; H04W 76/34
  See application file for complete search history.

(56) References Cited

U.S. PATENT DOCUMENTS

| | | | | |
|---|---|---|---|---|
| 2016/0192249 | A1* | 6/2016 | Wu | H04W 76/18 370/331 |
| 2016/0269931 | A1* | 9/2016 | Dinan | H04W 24/10 |
| 2016/0270061 | A1* | 9/2016 | Dinan | H04W 76/38 |
| 2016/0270095 | A1* | 9/2016 | Dinan | H04L 5/0057 |
| 2016/0278083 | A1* | 9/2016 | Dinan | H04B 7/0626 |
| 2016/0338118 | A1* | 11/2016 | Vajapeyam | H04B 17/318 |
| 2017/0070896 | A1* | 3/2017 | Shindo | H04W 24/02 |
| 2018/0013519 | A1* | 1/2018 | Lee | H04L 1/18 |

FOREIGN PATENT DOCUMENTS

| | | | |
|---|---|---|---|
| WO | WO 2014/109565 A1 | 7/2014 | |
| WO | WO 2014111027 A1 | 7/2014 | |
| WO | WO2016/114575 * | 1/2016 | ............... H04L 5/00 |

OTHER PUBLICATIONS

Huawei et al R2-143217, Introduce PUCCH on SCell for CA; Aug. 17, 2014.
3GPP TSG RAN Meeting #66, Maui, Hawaii (US), Dec. 8-11, 2014, RP-142286, "New WI proposal: LTE Carrier Aggregation Enhancement Beyond 5 Carriers", Nokia Corporation, et al., 9 pgs.
3GPP TS 36.300 V12.4.0 (Dec. 2014), "3$^{rd}$ Generation Partnership Project; Technical specification Group Radio Access Network; Evolved Universal Terrestrial Radio Access (E-UTRA) and Evolved Universal Terrestrial Radio Access Network (E-UTRAN); Overall description; Stage 2 (Release 12)", 251 pgs.
3GPP TS 36.321, V12.4.0 (Dec. 2014), "3$^{rd}$ Generation Partnership Project; Technical Specification Group Radio Access Network; Evolved Universal Terrestrial Radio Access (E-UTRA); Medium Access Control (MAC) protocol specification (Release 12)", 60 pgs.
3GPP TS 36.331, V12.4.1 (Dec. 2014), 3$^{rd}$ Generation Partnership Project; Technical Specification Group Radio Access Network; Evolved Universal Terrestrial Radio Access (E-UTRA); Radio Resource Control (RRC); Protocol specification (Release 120, 410 pgs.

* cited by examiner

PHYSICAL UPLINK CONTROL CHANNEL CELLS IN A COMMUNICATION NETWORK USING CARRIER AGGREGATION

BACKGROUND OF THE INVENTION

Field of the Invention

The present invention relates to physical uplink control channel (PUCCH) cells in a communication network using carrier aggregation.

Related Background Art

In E-UTRA, carrier aggregation (CA) has been introduced, where two or more component carriers (CCs) are aggregated in order to support wider transmission bandwidths up to 100 MHz. In CA it is possible to configure a UE to aggregate a different number of CCs originating from the same eNodeB (eNB) of the communication network and of possibly different bandwidths in the uplink (UL) and downlink (DL). When in CA, a UE is always configured with a primary cell (PCell). The PCell is used for security, NAS mobility, and transmission of a PUCCH (including scheduling requests). All other configured CCs are called secondary cells (SCells) and do not have the PUCCH configured. Furthermore, in CA, the possibility to de-activate CCs/SCells in order to reduce the UE power consumption is supported. The UE monitoring activity of a de-activated SCell is reduced (e.g. neither PDCCH monitoring nor CQI measurements are performed) and the UL activity in a de-activated carrier is also stopped (e.g. no SRS is transmitted). Note that the PCell which carries the PUCCH cannot be deactivated.

When there is a problem on the PCell, for example an RLF, all the communication is stopped and the UE tries to re-connect with the communication network through re-establishment. This interrupts the communication and causes delay.

The following meanings for the abbreviations used in this specification apply:
CA Carrier Aggregation
CC Component Carrier
CQI Channel Quality Indication
DL Downlink
eNB evolved NodeB
E-UTRA Evolved UMTS Terrestrial Radio Access
SCell Secondary Cell
PCell Primary Cell
PDCCH Physical Downlink Control Channel
pTAG PCell Timing Advance Group
PUCCH Physical Uplink Control Channel
PUG PUCCH Group
RLF Radio Link Failure
SRS Sounding Reference Signal
TAT Timing Advance Timer
UE User Equipment
UL Uplink
UMTS Universal Mobile Communications System

SUMMARY OF THE INVENTION

The present invention aims at overcoming the above-mentioned drawback. For example, communication between a user equipment and a communication network should be continued even if a link with a PCell is broken.

This is at least in part achieved by the method, apparatus and computer program product as defined in the appended claims.

In the following the invention will be described by way of embodiments thereof with reference to the accompanying drawings.

DESCRIPTION OF THE EMBODIMENTS

Recently, there has been an approach in the field of carrier aggregation (CA) for UEs supporting uplink carrier aggregation in that an SCell is configured with a PUCCH.

In the following it is assumed that serving cells are grouped in PUCCH groups (PUG): for each SCell, there is an associated cell with a PUCCH configured. For each cell carrying a PUCCH, the group of cells that are using this PUCCH is called a PUG.

When PUCCH is configured on two cells, PCell (Cell A) and SCell (Cell B), it can happen that the PCell experiences some problems. For example, the link is broken and a UE is not able to receive any signal from this cell.

According to the invention, two aspects are provided. According to a first aspect, more than one PUG is configured. According to a second aspect, in case of failure of a primary PUG, PUGs are exchanged.

To be more precise, in the first aspect, according to an embodiment of the invention, two PUGs are configured: a primary PUG (PPUG) containing a PCell (Cell A), and a secondary PUG (SPUG) containing an SCell with a PUCCH configured (Cell B).

In the second aspect, when the PPUG fails, the SPUG replaces it and becomes the PPUG. During this exchange, the SCell of the SPUG with a PUCCH configured becomes the PCell. According to an embodiment of the invention, this can be done automatically by a UE communicating with a communication network in case of a failure (e.g. RLF) in the PCell. According to another embodiment of the invention, the exchange can be performed pre-emptively in response to an instruction from the communication network based for example on measurement reports from the UE, RLF report from the UE or TAT expiry of pTAG, etc.

Figure 1:
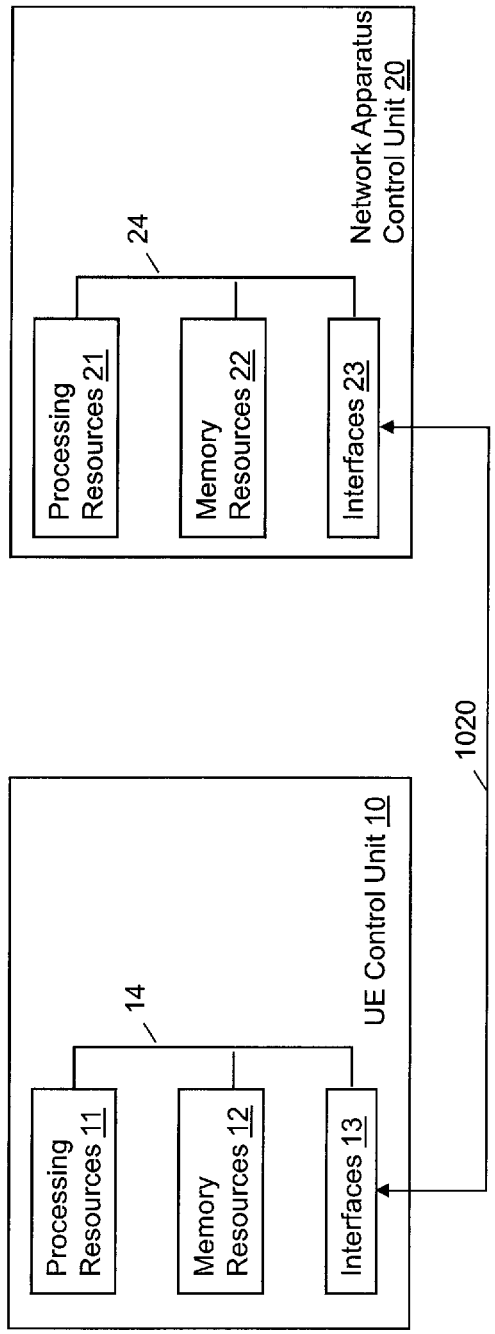
FIG. 1 shows a schematic block diagram illustrating a configuration of electronic devices in which examples of embodiments of the invention are implementable.

As a preliminary matter before exploring details of various implementations, reference is made to FIG. 1 for illustrating a simplified block diagram of a UE control unit 10 and a network apparatus control unit 20 which are suitable for use in practicing the exemplary embodiments of this invention.

The UE control unit 10 may be part of and/or used by a user equipmentn(UE), and the network apparatus control unit 20 may be part of and/or used by an eNodeB of a communication network. The UE control unit 10 comprises processing resources (e.g. processing circuitry) 11, memory resources (e.g. memory circuitry) 12 which may store a program, and interfaces (e.g. interface circuitry) 13, which are connected via a link 14. The interfaces 13 may comprise a suitable radio frequency (RF) transceiver (not shown) coupled to one or more antennas (not shown) for bidirectional wireless communications over one or more wireless links 1020 with the network apparatus control unit 20.

Similarly, the network apparatus control unit 20 comprises processing resources (e.g. processing circuitry) 21, memory resources (e.g. memory circuitry) 22 which may store a program, and interfaces (e.g. interface circuitry) 23, which are connected via a link 24. The interfaces 23 may comprise a suitable radio frequency (RF) transceiver (not shown) coupled to one or more antennas (not shown) for bidirectional wireless communications over one or more wireless links 1020 with the UE control unit 10.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the programs stored in the memory resources 11, 21 is assumed to include program instructions that, when executed by the associated processing resources 11, 21, enable the electronic device to operate in accordance with the exemplary embodiments of this invention. Inherent in the processing resources 11, 21 is a clock to enable synchronism among the various apparatus for transmissions and receptions within the appropriate time intervals and slots required, as the scheduling grants and the granted resources/subframes are time dependent. The transceivers include both transmitter and receiver, and inherent in each is a modulator/demodulator commonly known as a modem.

In general, the exemplary embodiments of this invention may be implemented by computer software stored in the memory resources 12 and executable by the processing resources 11 of the UE control unit 10 and similar for the other memory resources 22 and processing resources 21 of the network apparatus control unit 20, or by hardware, or by a combination of software and/or firmware and hardware in any or all of the devices shown.

In general, the various embodiments of a UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory resources 12, 22 may be of any type suitable to the local technical environment and may be implemented using any suitable data storage technology, such as semiconductor based memory devices, magnetic memory devices and systems, optical memory devices and systems, fixed memory and removable memory. The processing resources 11, 21 may be of any type suitable to the local technical environment, and may include one or more of general purpose computers, special purpose computers, microprocessors, digital signal processors (DSPs) and processors based on a multi core processor architecture, as non-limiting examples.

Figure 2:
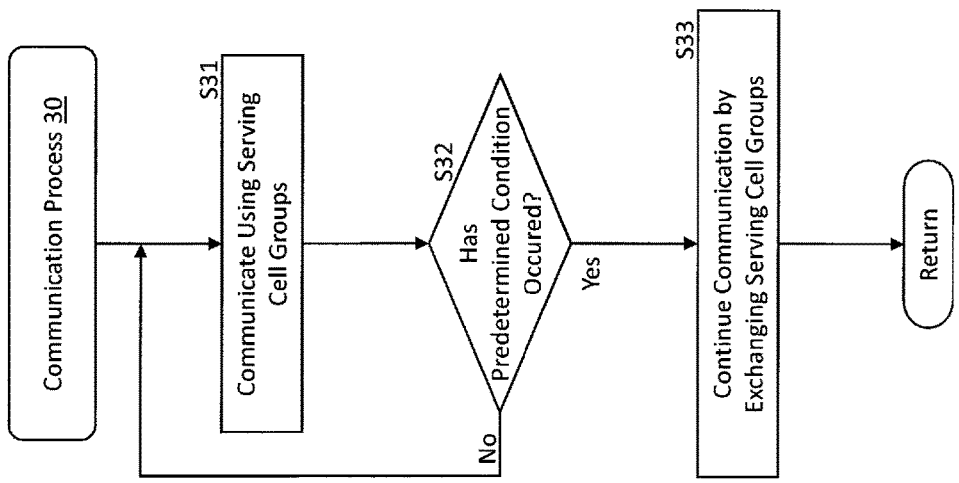
FIG. 2 shows a flowchart illustrating a communication process according to an embodiment of the invention.

FIG. 2 shows a flowchart illustrating a communication process 30 according to an embodiment of the invention.

The communication process 30 may be executed by the UE control unit 10 and/or the network apparatus control unit 20.

In step S31, a communication is executed between a user equipment (UE) and a communication network (e.g. an eNodeB) based on carrier aggregation in which a number of component carriers corresponding to a number of serving cells is aggregated and at least two physical uplink control channel (PUCCH) groups are configured. The communication is executed in step S31 using the at least two PUCCH groups. For example, the groups used are a first group which comprises a first cell of the number of serving cells, which is a PCell, that carries a first PUCCH, and first serving cells of the number of serving cells, which use the first PUCCH, and a second group which comprises a second cell of the number of serving cells, which is an SCell, that carries a second PUCCH, and second serving cells of the number of serving cells, which use the second PUCCH.

In step S32 it is checked whether or not a predetermined condition has occurred. In case it is determined that the predetermined condition has not occurred, the process 30 returns to step S31. Otherwise, in case it is determined that the predetermined condition has occurred, the process 30 proceeds to step S33. The predetermined condition comprises detection of a failure in the primary serving cell (PCell) such as a radio link failure which may be detected by the UE, or an instruction to exchange the PUCCH groups which may be issued from the communication network and is detected by the UE.

According to an implementation example of the invention, the UE detects the failure in the primary serving cell, exchanges the first and second groups in response to detecting the failure, and indicates the exchange to the communication network. In response to receiving the exchange indication from the UE, the communication network, e.g. an eNodeB, also performs the exchange of the PUCCH groups.

According to another implementation example, the UE detects the failure in the primary serving cell, reports the failure to the communication network e.g. via the secondary serving cell, receives an instruction to exchange the first and second groups from the communication network, and exchanges the first and second groups in response to receiving the instruction.

As described above, report on detection of the failure is based for example on measurement reports from the UE, RLF report from the UE or TAT expiry of pTAG, etc. The communication network, e.g. an eNodeB, exchanges the first and second groups in response to receiving such report.

In step S33, the communication is continued by exchanging the serving cell group by another one of the at least two PUCCH groups. For example, the first group is exchanged by the second group of the at least two PUCCH groups. With such exchange, the SCell becomes the PCell and vice versa. Then the process 30 returns.

According to an implementation example of the invention, when the exchange takes place as illustrated in step S33 in FIG. 2, e.g. triggered by an RLF on a PCell which does not initiate a re-establishment procedure, all the functions associated with the PCell (Cell A) are transferred to an SCell (Cell B) and vice versa. The communication between the UE and the communication network will continue using the Cell B as PCell. Further, the PUCCH association does not change: the SCells associated with Cell B for PUCCH will still be associated with Cell B. And the SCells associated with Cell A will continue to be associated witch Cell A.

A re-establishment procedure will only be triggered when an RLF occurs on both Cell A and Cell B.

Thus, an advantage is that the communication with the communication network will continue even if the link with Cell A is broken.

According to an aspect of the invention, a communication apparatus is provided, comprising means for executing communication between a user equipment and a communication network based on carrier aggregation in which a number of component carriers corresponding to a number of serving cells are aggregated and at least two physical uplink control channel (PUCCH) groups are configured, the communication being executed using a first group of the at least two PUCCH groups, the first group comprising a first cell of the number of serving cells, which is a primary serving cell, that carries a first PUCCH, and first serving cells of the number of serving cells, which use the first PUCCH, and a second group of the at least two PUCCH groups, the second group comprising a second cell of the number of serving cells, which is a secondary serving cell, that carries a second PUCCH, and second serving cells of the number of serving cells, which use the second PUCCH. The communication apparatus further comprises means for, in case a predetermined condition occurs, continuing the communication by exchanging the first group by the second group wherein the secondary serving cell that carries the second PUCCH becomes the primary serving cell and vice versa.

According to example embodiments of the invention, the predetermined condition comprises detection of a failure in the primary serving cell, or receipt of an instruction to exchange the first and second groups.

According to an example embodiment of the invention, the failure in the primary serving cell comprises a radio link failure on the primary serving cell.

According to an example embodiment of the invention, the communication apparatus is the user equipment and comprises means for detecting the failure in the primary serving cell, means for exchanging the first and second groups in response to detecting the failure, and means for indicating the exchange to the communication network.

According to an example embodiment of the invention, the communication apparatus is the user equipment and comprises means for detecting the failure in the primary serving cell, means for reporting the failure to the communication network via the secondary serving cell, means for receiving an instruction to exchange the first and second groups, and means for exchanging the first and second groups in response to receiving the instruction.

According to an example embodiment of the invention, the communication apparatus is an eNodeB of the communication network and comprises means for detecting the failure in the primary serving cell by receiving a report on the failure from the user equipment.

The communication apparatus may comprise and/or use the control unit 10 e.g. for executing the above-described process 30, and the means for executing communication, continuing communication, detecting, exchanging, indicating, reporting and receiving may be implemented by the processing resources 11 and memory resources 12. Also the interfaces 13 may be used for the implementation.

Alternatively, the communication apparatus may comprise and/or use the control unit 20 e.g. for executing the above-described process 30, and the means for executing communication, continuing communication and detecting may be implemented by the processing resources 21 and memory resources 22. Also the interfaces 23 may be used for the implementation.

According to an aspect of the invention, a communication is executed between a user equipment and a communication network based on carrier aggregation using a first group of at least two PUCCH groups, the first group comprising a primary serving cell that carries a first PUCCH, and first serving cells which use the first PUCCH, and a second group of the at least two PUCCH groups, the second group comprising a secondary serving cell that carries a second PUCCH, and second serving cells which use the second PUCCH. In case a predetermined condition occurs, the communication is continued by exchanging the first group by the second group wherein the secondary serving cell that carries the second PUCCH becomes the primary serving cell and vice versa.

It is to be understood that the above description is illustrative of the invention and is not to be construed as limiting the invention. Various modifications and applications may occur to those skilled in the art without departing from the true spirit and scope of the invention as defined by the appended claims.

What is claimed is:

1. A method, the method comprising:
executing, by a user equipment, communication between the user equipment and a communication network based on carrier aggregation in which a number of component carriers corresponding to a number of serving cells are aggregated and at least two physical uplink control channel (PUCCH) groups are configured, the communication being executed using the following:
a first group of the at least two PUCCH groups, the first group comprising a first cell of the number of serving cells, which is a primary serving cell, that carries a first PUCCH, and first serving cells of the number of serving cells, which use the first PUCCH, and
a second group of the at least two PUCCH groups, the second group comprising a second cell of the number of serving cells, which is a secondary serving cell, that carries a second PUCCH, and second serving cells of the number of serving cells, which use the second PUCCH; and
in case a failure in the primary serving cell is detected by the user equipment, continuing the communication by exchanging by the user equipment the first group and the second group, wherein the secondary serving cell that carries the second PUCCH becomes a current primary serving cell and the primary serving cell that carried the first PUCCH in the first group becomes a current secondary serving cell.

2. The method of claim 1, wherein the failure in the primary serving cell comprises a radio link failure on the primary serving cell.

3. The method of claim 1, further comprising:
detecting the failure in the primary serving cell;
exchanging the first and second groups in response to detecting the failure; and
indicating the exchange to the communication network.

4. The method of claim 1, further comprising:
detecting the failure in the primary serving cell;
reporting the failure to the communication network via the secondary serving cell;
receiving an instruction to exchange the first and second groups; and
exchanging the first and second groups in response to receiving the instruction.

5. A computer program product comprising a computer-readable medium having a program, comprising software code portions, the program causing the apparatus to perform the following, when the program is run on the apparatus:

executing, by a user equipment, communication between the user equipment and a communication network based on carrier aggregation in which a number of component carriers corresponding to a number of serving cells are aggregated and at least two physical uplink control channel (PUCCH) groups are configured, the communication being executed using the following:

a first group of the at least two PUCCH groups, the first group comprising a first cell of the number of serving cells, which is a primary serving cell, that carries a first PUCCH, and first serving cells of the number of serving cells, which use the first PUCCH, and a second group of the at least two PUCCH groups, the second group comprising a second cell of the number of serving cells, which is a secondary serving cell, that carries a second PUCCH, and second serving cells of the number of serving cells, which use the second PUCCH; and in case a failure in the primary serving cell is detected by the user equipment, continuing the communication by exchanging by the user equipment the first group and the second group, wherein the secondary serving cell that carries the second PUCCH becomes a current primary serving cell and the primary serving cell that carried the first PUCCH in the first group becomes a current secondary serving cell.

6. A communication apparatus, comprising:

at least one processor and at least one memory including computer program code, wherein the at least one memory and the computer program code are configured to, with the at least one processor, cause the apparatus at least to perform:

executing, by a user equipment, communication between the user equipment and a communication network, based on carrier aggregation in which a number of component carriers corresponding to a number of serving cells are aggregated, and at least two physical uplink control channel (PUCCH) groups are configured, the communication being executed using the following:

a first group of the at least two PUCCH groups, wherein the first group comprises a first cell of the number of serving cells, which is a primary serving cell, that carries a first PUCCH, and first serving cells of the number of serving cells, which use the first PUCCH, and a second group of the at least two PUCCH groups, wherein the second group comprises a second cell of the number of serving cells, which is a secondary serving cell, that carries a second PUCCH, and second serving cells of the number of serving cells, which use the second PUCCH, in case failure in the primary serving cell is detected by the user equipment, continuing the communication by exchanging by the user equipment the first group and the second group, wherein the secondary serving cell that carries the second PUCCH becomes a current primary serving cell and the primary serving cell that carried the first PUCCH in the first group becomes a current secondary serving cell.

7. The communication apparatus of claim 6, wherein the communication apparatus is the user equipment, and the at least one memory and the computer program code are configured to, with the at least one processor, cause the apparatus at least to perform:

detecting the failure in the primary serving cell;

exchanging the first and second groups in response to detecting the failure; and indicating the exchange to the communication network.

8. The communication apparatus of claim 6, wherein the communication apparatus is the user equipment, and the at least one memory and the computer program code are configured to, with the at least one processor, cause the apparatus at least to perform:

detecting the failure in the primary serving cell;

reporting the failure to the communication network via the secondary serving cell;

receiving an instruction to exchange the first and second groups; and exchanging the first and second groups in response to receiving the instruction.

9. The communication apparatus of claim 6, comprising the user equipment.

10. The method of claim 1, wherein the continuing the communication by the exchanging by the user equipment is performed in case the failure in the primary serving cell is detected but a failure is not detected in the secondary serving cell, and wherein PUCCH association for the first and second groups does not change after the exchanging the first group by the second group.

11. The method of claim 1, wherein, in case failure is detected in both in the primary serving cell and the secondary serving cell, the method further comprises triggering by the user equipment a reestablishment procedure to reconnect the user equipment to the communication network.

* * * * *